(12) United States Patent
Sandelius et al.

(10) Patent No.: US 6,751,484 B1
(45) Date of Patent: Jun. 15, 2004

(54) PORTABLE COMMUNICATION APPARATUS HAVING VISUAL INDICATOR MEANS AND A METHOD OF PROVIDING VISUAL STATUS INDICATION THEREOF

(75) Inventors: Thomas Sandelius, Malmö (SE); Martin Ek, Dalby (SE); Anton Åberg, Malmö (SE); Joakim Nelson, Lund (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 304 days.

(21) Appl. No.: 09/607,441

(22) Filed: Jun. 30, 2000

(30) Foreign Application Priority Data

Jul. 8, 1999 (SE) ................................................ 9902624

(51) Int. Cl.7 ................................................ H04B 1/38
(52) U.S. Cl. ........................ 455/566; 455/226.1; 455/7
(58) Field of Search ............................. 455/566, 226.1, 455/226.2, 226.3, 226.4, 7

(56) References Cited

U.S. PATENT DOCUMENTS

| | | | | |
|---|---|---|---|---|
| 4,833,725 A | * | 5/1989 | Teetor ........................ 455/67.3 |
| 5,381,460 A | * | 1/1995 | Ohashi et al. ............... 455/566 |
| 5,577,267 A | * | 11/1996 | Jungles-Butler et al. ..... 455/128 |
| 5,880,732 A | | 3/1999 | Tryding |
| 5,923,254 A | * | 7/1999 | Brune ....................... 340/573.3 |
| 5,950,139 A | * | 9/1999 | Korycan ................... 455/226.2 |
| 5,963,852 A | * | 10/1999 | Schlang et al. ................ 455/76 |
| 6,301,490 B1 | * | 10/2001 | Callan .......................... 455/568 |
| 6,330,461 B1 | * | 12/2001 | Andersson ................... 200/314 |
| 6,438,363 B1 | * | 8/2002 | Feder et al. .............. 455/226.1 |

FOREIGN PATENT DOCUMENTS

WO    98/56152    12/1998

* cited by examiner

*Primary Examiner*—Charles Appiah
*Assistant Examiner*—Nghi H. Ly
(74) *Attorney, Agent, or Firm*—Burns, Doane, Swecker & Mathis, L.L.P.

(57) ABSTRACT

A portable communication used in a mobile communications network has a transceiver device for providing a first wireless communication link to the mobile communications network. It also has visual indicator adapted to emit a first visible light signal, within a first predetermined spectral range, for indicating a status of the first wireless communication link. The transceiver device also provides a second wireless communication link to equipment other than the mobile communications network. The visual indicator emits a second visible signal for indicating a status of the second wireless communication link. This second visible light signal is provided in a second spectral range, which is different from the first spectral range.

18 Claims, 3 Drawing Sheets

PORTABLE COMMUNICATION APPARATUS HAVING VISUAL INDICATOR MEANS AND A METHOD OF PROVIDING VISUAL STATUS INDICATION THEREOF

This application claims priority under 35 U.S.C. §§119 and/or 365 to Application No. 9902624-7 filed in Sweden on Jul. 8, 1999; the entire content of which is hereby incorporated by reference.

TECHNICAL FIELD

The present invention relates to a portable communication apparatus for use in a mobile communications network and having visual indicator means. More specifically, the present invention relates to a portable communication apparatus having a transceiver device for providing a first wireless communication link to the mobile communications network, where the visual indicator means is adapted to emit a first visible light signal, within a first predetermined spectral range, for indicating a status of the first wireless communication link, and where the transceiver device is further adapted to provide a second wireless communication link to equipment other than the mobile communications network.

BACKGROUND

A mobile or cellular telephone is a well-known example of a portable communication apparatus according to the above. Within the context of this document, reference will consistently be made to a mobile telephone for any commercially available mobile communications network, such as GSM. However, the invention is not limited to merely a mobile telephone; other equally applicable examples of portable communication apparatuses are radio pagers and communicators (also known as personal digital assistants), i.e. a portable telephone device including a computer and application programs, such as a built-in calendar. Moreover, the term "mobile communications network" is meant to have the widest possible meaning, thereby including all types of cellular networks, satellite networks, wireless local area networks (LANs), etc.

Mobile telephones are generally provided with a visual indicator for indicating status information about the connectivity of the mobile telephone with respect to the mobile communications network. Moreover, a battery charge indicator is often provided for alerting a user of the telephone, when the remaining battery charge drops below a predetermined limit. WO98/56152 discloses a mobile telephone having such status indicators.

One common approach is to provide the mobile telephone with a combined green and red indicator window mounted at the top of the telephone housing. A dual-color light emitting device, such as a red light emitting diode (LED) combined with a green LED, is mounted to a printed circuit board within the telephone housing. An optical light guide is arranged between the external indicator window and the internal light emitting device. The dual-color light emitting device may for instance be used according to the following:

| | |
|---|---|
| Green light flashing at low frequency | The mobile telephone is in contact with at least one base transceiver station (BTS) |
| No green light | No contact with any BTS |
| Green light flashing at a higher frequency | A message is available (such as SMS) |
| Red flashing light | Low battery charge level |
| Red continuous light | The battery is being recharged |

Consequently, a green visual indicator is used for informing the user of whether the mobile telephone is in operative contact with the mobile communications network (so that, inter alia, the user is free to initiate an outgoing telephone call) or whether the mobile telephone has currently lost its operative contact with the mobile communications network.

A more recent development within the field of mobile telephones and other portable communication apparatuses is the provision of a supplementary short-range radio link, in addition to the normal wireless communication link between the mobile telephone and the mobile communications network, for allowing simple, inexpensive and standardized wireless information exchange between the mobile telephone and other external equipment, such as hand-held, portable or stationary computers, home appliance, computer peripherals (such as printers), digital cameras, etc.

It is envisaged that such short-range radio links for information exchange with external devices will operate on a globally available microwave band, for instance around 2.4 GHz. It has been suggested to use the free ISM band ("Instrumentation, Scientific and Medical band"), which is available in 79 channels between 2.402 GHz and 2.480 GHz. The typical operating distance of such a short-range radio link is believed to be between 10 cm and 10 m, but the upper limit may easily be extended to more than 100 m by increasing the transmit power.

SUMMARY

According to the invention, the following problem is identified and a solution thereof is provided, as defined by the enclosed independent patent claims.

While it is well-known to use a flashing green light for indicating operative contact between mobile telephone and mobile communications network, the problem of providing a sufficient indication to the user of the momentary availability of external peripheral devices through a supplementary short-range radio link does not appear to have been addressed in the prior art. When considering this problem in more detail, one realizes that the telephone user would definitely benefit, if he or she were given an accurate indication of the availability of an operative wireless link not only to the mobile communications network but also to external devices over the supplementary short-range radio link. For instance, assuming that the user of the mobile telephone will carry the telephone throughout a working day between various places within an office environment, then at any given moment in time, an unknown number of external devices may or may not be operatively available within, say, 10 m from the mobile telephone. However, if no indication of this is given to the user, he or she will often, unknowingly, miss the opportunity of connecting to and using such momentarily available external devices.

The above problem is solved through the inventive understanding that user feedback is best given by providing an additional visual indication of operative contact with such external devices, wherein the additional visual indication is clearly separated from the normal visual indication of operative contact with the mobile communications network. More specifically, the additional visual indication occurs in a different spectral range than the normal visual indication. Preferably, the availability of external devices over the supplementary short-range radio link is indicated by a blue light, while the connectivity between the mobile telephone and the mobile communications network is indicated, as normal, by a green light. Information about the remaining charge level of the battery may be given through a red light, as is generally known per se.

Other objects, features and advantages of the present invention will appear from the following disclosure of the preferred embodiments, from the attached drawings as well as from the dependent claims.

BRIEF DESCRIPTION OF THE DRAWINGS

The present invention will now be described in more detail, reference being made to the accompanying drawings, in which.

DETAILED DESCRIPTION

Figure 1:
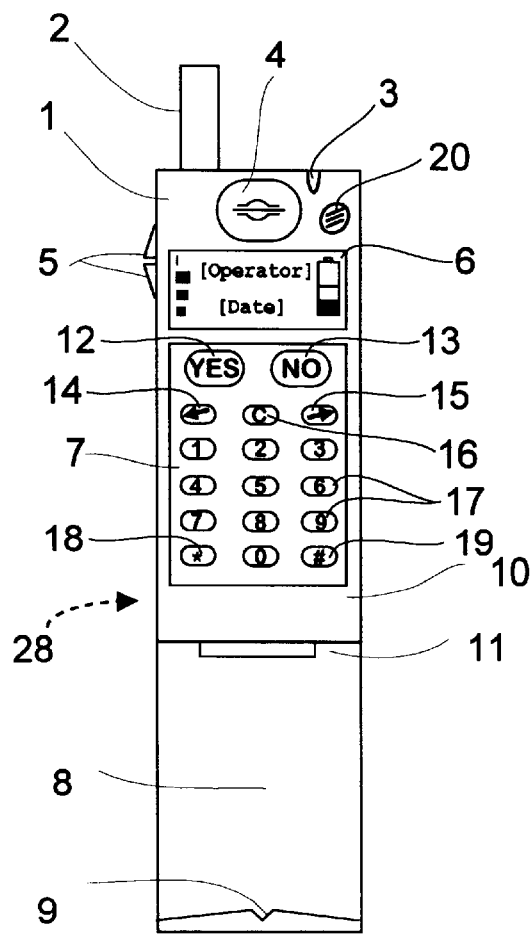
FIG. 1 is a schematic front view of a portable communication apparatus, exemplified as a mobile telephone, having a novel visual indicating means according to the invention.

In all the drawings, similar or identical reference numerals have a similar or identical meaning and are therefore only described in detail with reference to the first drawing, in which they appear.

An example of a portable communication apparatus is given in FIG. 1 in the form of a mobile telephone 1. The telephone has a housing 10, an antenna 2 mounted on top of the housing, a status indicator window 3, a speaker 4, volume adjustment controls 5, an LCD display 6 and a keypad 7. The keypad 7 has a plurality of individual keys, such a YES button 12 and a NO button 13, arrow keys 14, 15, a clear key 16, numeric keys 17 (labelled "0" through "9"), a star key 18 and a hash key 19. A transparent decal 20 is attached to the upper front portion of the telephone housing 10 and contains a commercial sign, such a company logotype. A rechargeable battery 28 is mounted at the rear of the telephone housing 10 and is therefore not visible in the front view of FIG. 1. Consequently, the battery 28 has only been indicated by way of a dashed arrow. A foldable flip 8 is movably mounted to the apparatus housing 10 by means of a hinge mechanism 11. The flip 8 comprises a sound opening 9, through which vocal sound is received from the user of the telephone and forwarded to an internal microphone (not shown in the drawing)

Figure 2:
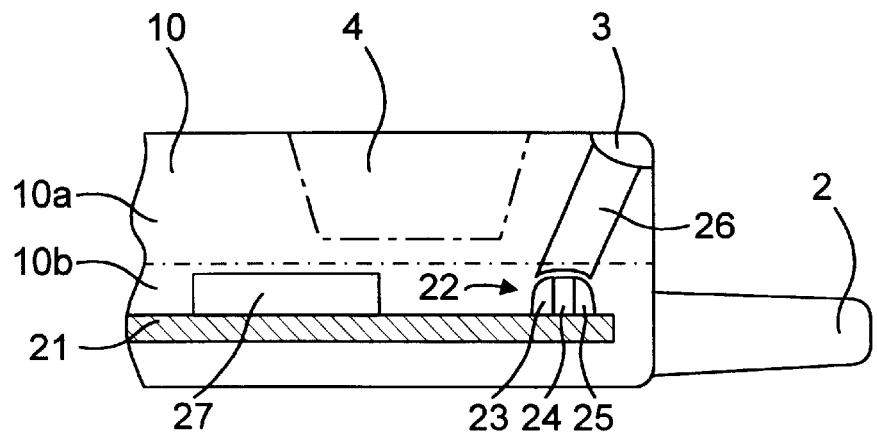
FIG. 2 is a schematic, sectional, enlarged view of a portion of the telephone shown in FIG. 1, according to a first preferred embodiment.

Referring now to FIG. 2, a sectional view is shown of an upper portion of the telephone 1 according to a first preferred embodiment, wherein the view is taken along a vertical section, which runs essentially through the status indicator window 3. The telephone housing 10 comprises an upper portion 10a, which is firmly mounted to a lower portion 10b.

The upper housing portion 10a contains, inter alia, the loudspeaker 4 and the status indicator window 3. It also contains a light guide 26, which will be described in more detail below. The lower housing portion 10b contains, inter alia, a printed circuit board 21, upon which a transceiver or radio device 27 is mounted.

In the preferred embodiment, the transceiver device 27 is a conventional dual-channel homodyne transmitter/receiver for use in a TDMA (Time Division Multiple Access) mobile communications network, such as GSM. As is readily realized by the skilled person, the transceiver device 27 comprises various radio circuitry, such as band-pass filters, amplifiers, local oscillators, mixers, lowpass filters, AD converters, digital filters, etc. Moreover, the transceiver device 27 comprises additional radio circuitry for providing a supplementary short-range radio link for accessing external devices other than the ones comprised in the mobile communications network. However, any commercially available transceiver device may replace the device 27, since the present invention is not directed at the parts of the apparatus, which are responsible for providing the normal communication link to the mobile communications network and the supplementary short-range radio link to external devices.

As is readily appreciated by a man skilled in the art, the printed circuit board 21 will also contain various conventional electronic and logic circuitry, such as at least one controller (CPU, DSP, programmable logic array, etc), memory circuits, etc. Moreover, the printed circuit board 21 has a light emitting device 22 mounted thereon at its uppermost end (facing the antenna 2). The light guide 26 is connected at a first end to the status indicator window 3 and at a second end to the light emitting device 22. Furthermore, although not shown in FIG. 2, the lower housing portion 10b also contains the rechargeable battery 28, which is indicated in FIG. 1.

The light emitting device 22 of the first embodiment comprises a green light emitting diode. (LED) 23, a red light emitting diode 24 and a blue light emitting diode 25. The three diodes 23–25 are jointly mounted to the printed circuit board 21 and are all driven by logic circuitry not shown in FIG. 2. The light emitted from the respective diode 23, 24 and 25 is guided through the light guide 26 to the status indicator window 3 for the purpose of providing status information to the user, as will be described below. In the preferred embodiment of FIG. 2, the light emitting device 22 is implemented by a three-color LED, which is commercially available under the model name CL-320 from Citizen, 1-23-1, Kami-kurechi, Fujiyoshida-shi, Yamanashi-ken 403-0001, Japan. Alternatively, the device 22 may be implemented by a three-color LED of the LNJ717W80RA series from Panasonic, Kagoshima Matsushita Electronics Co, Ltd, 899-25 Maedabira 1786-6, Oaza Tokushige, ljuin-cho, Hiokigun, Kagoshima Prefecture, or by any other commercially available device.

Figure 4:
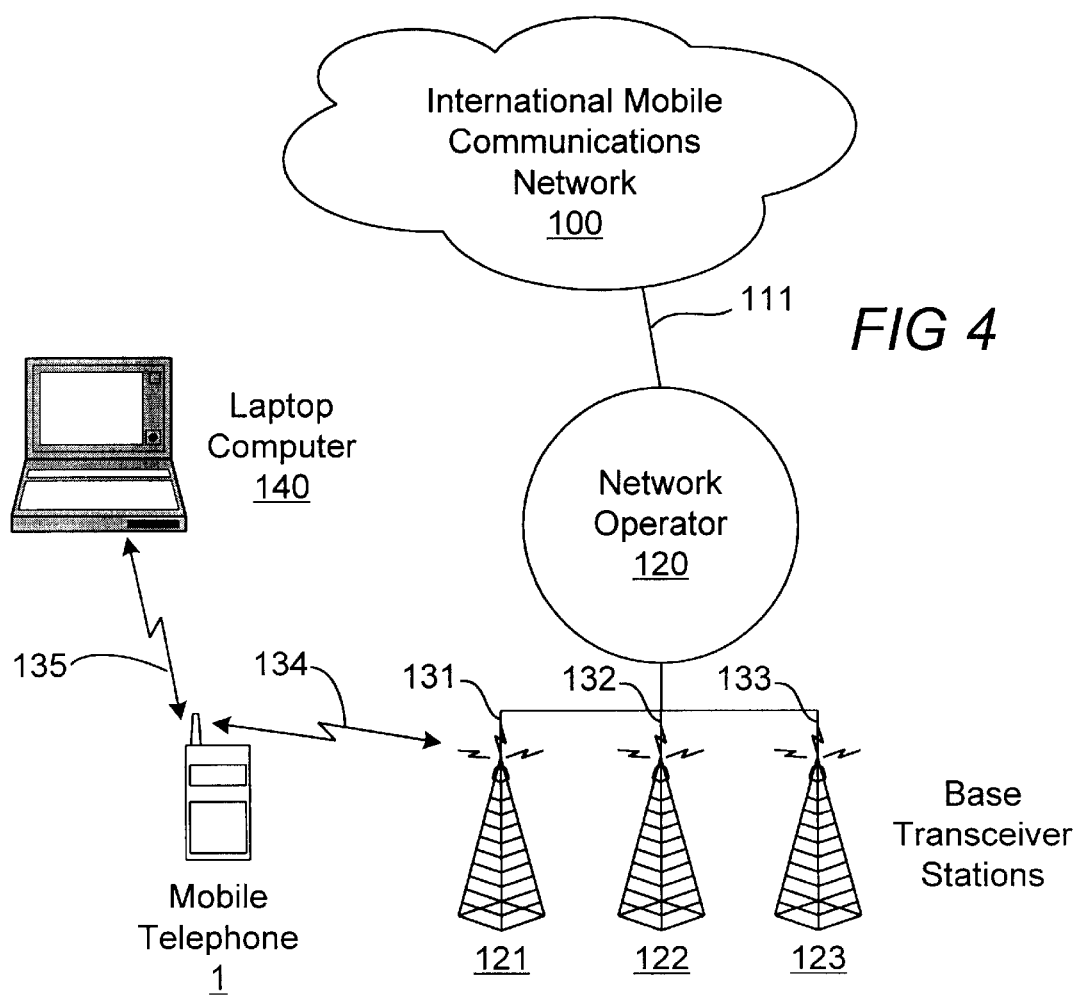
FIG. 4 is a schematic block diagram, illustrating a mobile communications network, a mobile telephone and an external device, with which the mobile telephone communicates over a short-range radio link.

Referring now to FIG. 4, an exemplifying real-life use of the mobile telephone 1 is illustrated. Thee user of the mobile telephone 1 has a mobile communications subscription at a mobile communications network operator 120. The network operator 120 disposes of various mobile communications network equipment, including a plurality of base transceiver stations (BTS) 121, 122, 123, which are connected to the network operator 120 through respective links 131, 132, 133. The mobile telephone 1 accesses the mobile communications network 100 over a wireless link 134 to the nearest base transceiver'station 121. Moreover, the mobile communications network provided by the network operator 120 is a conventional cellular mobile communications network, such as GSM, which in turn is part of an international mobile communications network 100, to which the network operator 120 is connected through a link 111. In GSM, the wireless link 134 operates on either 900 MHz or 1800 MHz.

Furthermore, the mobile telephone 1 may establish, through the transceiver device 27, a supplementary short-range radio link 135 with any piece of external equipment, such as a laptop computer 140, which is provided with corresponding circuitry and functionality and is available in proximity with the mobile telephone 1, for instance within a distance of 10 m. In the preferred embodiment, the supplementary short-range radio link 135 operates on any of 79 available channels between 2.402 GHz and 2.480 GHz in the free ISM band. However, other frequency bands, both higher and lower, are equally possible.

The preferred embodiment of the mobile telephone 1 shown in FIG. 2 is adapted to provide the following visual status information through the LEDs 23–25:

| LED | Color | Intensity | Meaning |
| --- | --- | --- | --- |
| 23 | Green | Flashing (slowly) | Mobile telephone 1 has operative contact with the mobile communications network 100 |
| 23 | Green | Flashing (rapidly) | A message is available at the network operator 120 |
| 24 | Red | Flashing | Low remaining charge of battery 28 |
| 24 | Red | Continuous | Battery 28 is being recharged |
| 25 | Blue | Flashing | External device 140 has been detected over the supplementary short-range radio link 135 |
| 25 | Blue | Continuous | Information is being exchanged across the supplementary short-range radio link 135 |

Figure 5:
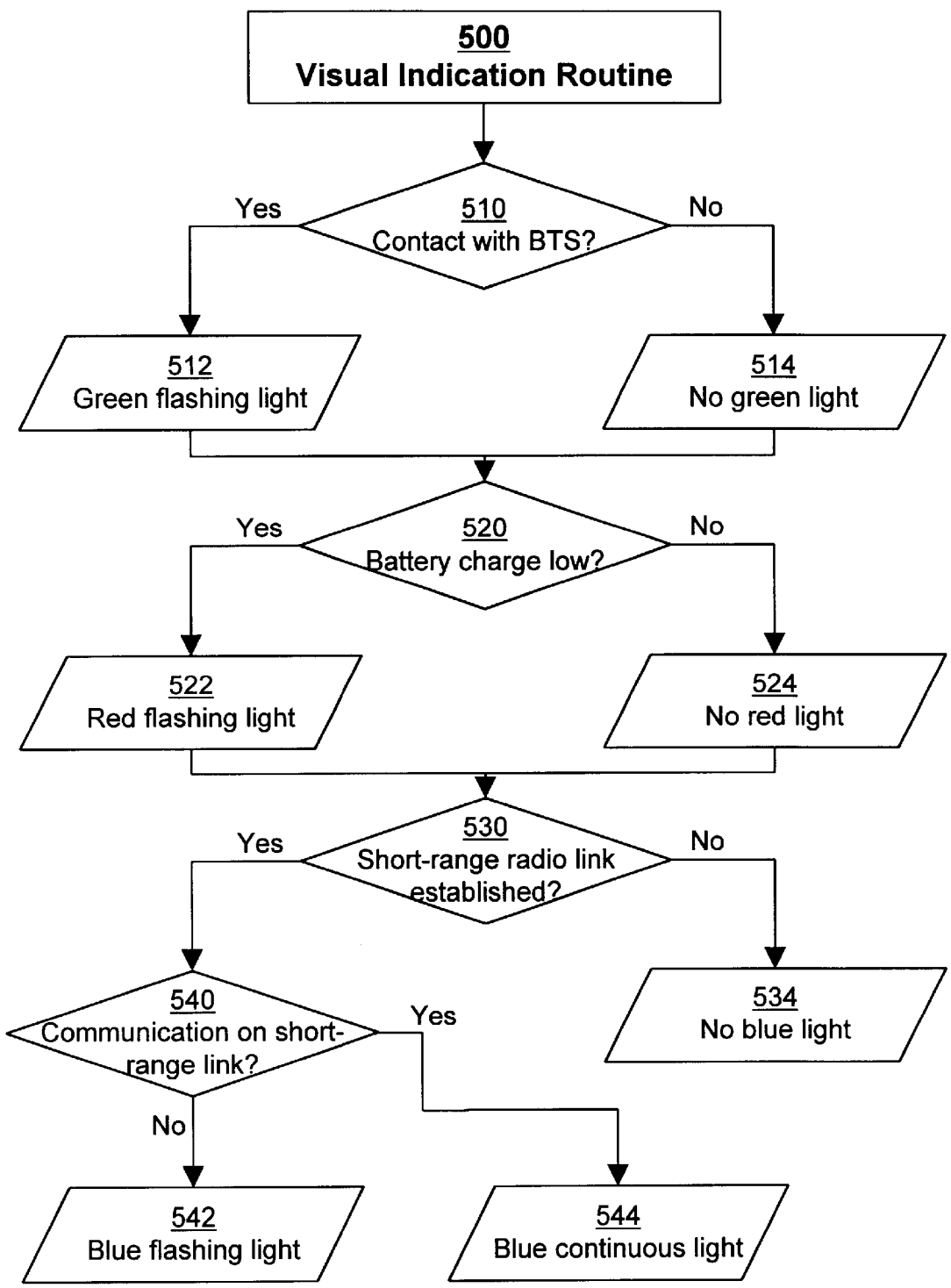
FIG. 5 is a flow chart illustrating a method of providing visual indication according to the preferred embodiments of the invention.

With reference to FIG. 5, a visual indication routine 500 is illustrated, as executed by a controller within the mobile telephone 1, for instance a CPU or other kind of programmable logic means, in association with appropriate memory circuits for storing the program instructions of routine 500 as well as the data processed therein. In a first step 510, it is determined whether the mobile telephone 1 is in operative contact with any of the base transceiver stations 121–123. If the answer is in the affirmative, the green light emitting diode 23 is driven to produce a green flashing light in a subsequent step 512; otherwise no green light is produced by the green light emitting diode 23 in a step 514. In any case, in a following step 520, it is determined whether the remaining charge of the battery 28 is below a predetermined limit. If that is the case, the control is continued to a step 522, and the red light emitting diode 24 is driven to produce a red flashing light. Otherwise, i.e. if the battery 28 has a sufficient level of battery charge, no red light is produced in a step 524. In case the battery 28 is currently recharged by an external charger, steps 520–524 are replaced by other steps (not shown), where the red light emitting diode 24 is driven to produce a red continuous light.

In a subsequent step 530, it is determined whether a short-range radio link 135 has been established with any external device, such as the laptop computer 140 in FIG. 4. If no such link has been established, the control is transferred to a subsequent step 534, wherein no blue light is produced by the blue light emitting diode 25.

On the other hand, if a short-range link 135 has in fact been established with for instance the laptop computer 140, the, control is continued to a subsequent step 540, where it is determined whether any significant amount of information is currently communicated across the link 135. If that is not the case, i.e. if the link 135 is established but is essentially idle or in a stand-by mode, the blue light emitting diode 25 is driven, in a subsequent step 542, to produce a blue flashing light to be emitted via the light guide 26 through the status indicator window 3. Otherwise, the control is transferred to a step 544, wherein a blue continuous light is produced by the blue light emitting diode 25.

The visual indication routine 500 is preferably executed regularly by aforesaid controller according to any appropriate time schedule. Alternatively, the execution of the visual indication routine 500 may be interrupt-driven, so that the routine 500 is executed whenever a change of state occurs for the mobile telephone 1, for instance when an external device 140 has been detected within range of the mobile telephone 1, and a supplementary short-range radio link 135 is established.

Figure 3:
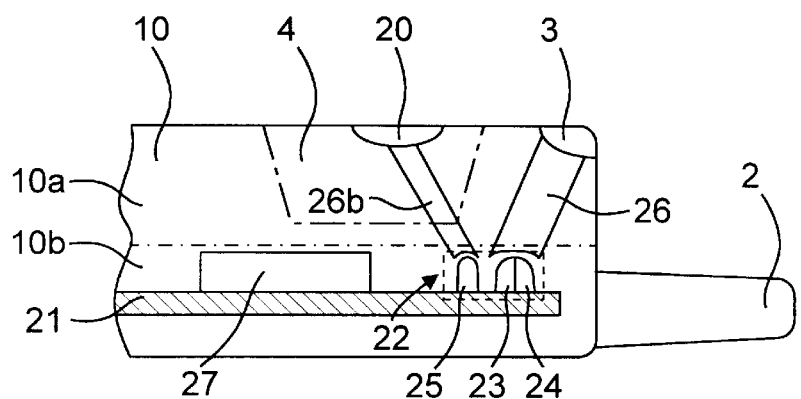
FIG. 3 is a schematic, sectional, enlarged view of a portion of the telephone shown in FIG. 1, according to a second preferred embodiment.

Referring to FIG. 3, a second preferred embodiment of the present invention is illustrated. The following components are identical between the embodiments shown in FIGS. 2 and 3, and the description thereof is not repeated now: the antenna 2, the status indicator window 3, the loudspeaker 4, the telephone housing 10 including its upper and lower portions 10a, 10b, the printed circuit board 21 and the transceiver device 27. The light emitting device 22 still comprises a green light emitting diode 23, a red light emitting diode 24 and a blue light emitting diode 25. However, in the embodiment of FIG. 3 only the green and red light emitting diodes 23, 24 are jointly mounted next to each other on the printed circuit board. The blue light emitting diode 25 is mounted at a small distance from the diodes 23, 24.

As shown in FIG. 3, the green and red light emitting diodes 23, 24 are mounted close to one end of a first light guide 26, the second end of which connects to the status indicator window 3. Moreover, the blue light emitting diode 25 is mounted adjacent to a first end of a second light guide 26b, which is connected at a second end to the transparent decal 20, which has been described above with reference to FIG. 1 but which was not indicated in FIG. 2. Consequently, the green and red light emitting diodes 23, 24 are arranged to emit green and red light, respectively, to be guided through the first light guide 26 to the status indicator window 3. Correspondingly, the blue light emitting diode 25 is arranged to emit blue light to be transmitted through the second light guide 26b to the transparent decal 20.

With the exception of this difference, the second preferred embodiment of FIG. 3 is operated in the same way as the first preferred embodiment of FIG. 2. Consequently, the visual indication routine 500 of FIG. 5 is applicable also to the second preferred embodiment of FIG. 3. The embodiment of FIG. 3 uses, as the green and red light emitting diodes 23, 24, a two-color combined green and red LED, which is available under the model name CL-165 or CL-155 from Citizen. The blue light emitting diode 25 is implemented by a one-color blue LED available under the model name CL-270 HB from Citizen.

The present invention has been described above with reference to a few embodiments. However, other embodiments than the ones explicitly described are equally possible within the scope of the invention, as defined by the appended independent patent claims. In particular, the exact realization of the light emitting device 22 and the individual light emitting members 23, 24, 25 thereof may differ from the examples given in FIGS. 2 and 3. Other means than light emitting diodes may be used for the members 23, 24, 25.

Furthermore, the third light emitting member 25, which indicates activity on a supplementary short-range radio link, may be adapted to emit light of another color than blue, for instance yellow (Citizen CL-270Y or CL-270LY) or white. Moreover, the intensity of the light emitted by the third light emitting member 25 maybe used in other ways than the ones disclosed above for indicating different aspects of the status and activity of the short-range radio link 135.

Finally, even if the disclosure above has been focused on a first communication link in the form of a conventional wireless mobile communications link, and a second communication link in the form of a supplementary short-range radio link to external devices, other forms of the first and second communication links are equally possible within the scope of the invention.

What is claimed is:

1. A portable communication apparatus for use in a mobile communications network, the apparatus comprising a transceiver device for providing a first wireless communication link to the mobile communications network and for providing a second wireless communication link to equipment other than the mobile communications network and visual indicator means for visually separating the availability of the first and second link adapted to emit a first visible light signal, within a first predetermined spectral range, for indicating whether said apparatus is in operative contact with the mobile communications network via the first wireless communication link, and a second visible light signal for indicating whether said apparatus is within an operational proximity range of said equipment, the second visible light signal being provided in a second spectral range, different from the first spectral range.

2. The apparatus according to claim 1, wherein the visual indicator means comprises a first light emitting member adapted to emit light having a first color and a second light emitting member adapted to emit light having a second color.

3. The apparatus according to claim 2, wherein at least one of said first and second light emitting members is a light emitting diode (LED).

4. The apparatus according to claim 2, wherein said second color is blue.

5. The apparatus according to claim 2, wherein said first color is green.

6. The apparatus according to claim 1, wherein the second visible light signal has pulsed intensity, so as to indicate an operative contact, over said second wireless communication link, with said equipment.

7. The apparatus according to claim 1, wherein said second visible light signal has substantially uniform intensity during an ongoing transmission of information over said second wireless communication link.

8. The apparatus according to claim 1, further comprising an apparatus housing and a printed circuit board mounted internally in said housing, wherein the visual indicator means is mounted to said printed circuit board, and a light guide is provided between the visual indicator means and a first transparent member provided in said housing.

9. The apparatus according to claim 8, wherein the visual indicator means comprises a light emitting member adapted to emit light having a first color and a second light emitting member adapted to emit light having a second color, the apparatus further comprising a second light guide arranged between the second light emitting member and a second transparent member provided in said housing at a distance from said first transparent member.

10. The apparatus according to claim 9, wherein the second transparent member comprises a decal for indicating a sign.

11. The apparatus according to claim 1, further comprising a rechargeable battery, wherein the visual indicator means is adapted to emit a third, visible light signal for indicating an electric charge status of the battery.

12. The apparatus according to claim 2, further comprising a rechargeable battery, wherein the visual indicator means is adapted to emit a third visible light signal for indicating an electric charge status of the battery and comprises a third light emitting member, adapted to emit light having a third color.

13. The apparatus according to claim 1, wherein said second wireless communication link is a short-range radio link.

14. The apparatus according to claim 1, wherein the apparatus is a radio telephone.

15. A method of providing visual status indication for a portable communication radio, which is simultaneously operative in a first frequency range and in a second frequency range, different from the first frequency range, the method comprising:

a) providing a first visual output when the portable communication radio has a first operative communication link to at least a first external device within said first frequency range, b) detecting at least a second external device within an operational proximity range of the portable communication radio, and c) providing, independently of step a), a second visual output when the portable communication radio has a second operative communication link to at least a second external device within said second frequency range.

16. The method according to claim 15, wherein the first and second visual outputs are provided in separate spectral ranges.

17. The method according to claim 15, wherein the second visual output is provided as a signal of visible light having a blue color.

18. A method of providing visual status indication for a portable communication radio, which is simultaneously operative in a first frequency range and in a second frequency range, different from the first frequency range, the method comprising:

a) providing a first visual output when the portable communication radio has a first operative communication link to at least a first external device within said first frequency range, b) providing, independently of step a), a second visual output when the portable communication radio has a second operative communication link to at least a second external device within said second frequency range, and c) determining whether a significant amount of information is transmitted between the portable communication radio and the second external device over said second communication link or whether said second communication link is in an idle or a stand-by mode, where operative contact is upheld between the second external device and the portable communication radio, but no significant amount of information is transmitted there between, and in response modifying an intensity of the second visual output.

* * * * *